United States Patent [19]

Musch et al.

[11] 4,091,270

[45] May 23, 1978

[54] ELECTRONIC CALCULATOR WITH OPTICAL INPUT MEANS

[75] Inventors: Bernard E. Musch, Palo Alto; Roy E. Martin, San Jose, both of Calif.

[73] Assignee: Hewlett-Packard Company, Palo Alto, Calif.

[21] Appl. No.: 706,972

[22] Filed: Jul. 19, 1976

[51] Int. Cl.² .................... G06K 15/00; G06K 7/10
[52] U.S. Cl. .................................... 235/419; 235/462
[58] Field of Search .................. 235/61.6 R, 61.11 E

[56] References Cited

U.S. PATENT DOCUMENTS

| | | | |
|---|---|---|---|
| 3,511,974 | 5/1970 | Wang | 235/61.6 R |
| 3,524,970 | 8/1970 | Wang | 235/61.6 R |
| 3,654,449 | 4/1972 | Boyce | 235/92 R |
| 3,886,325 | 5/1975 | Dorr et al. | 235/61.6 R |
| 3,978,318 | 8/1976 | Romeo et al. | 235/61.11 E |
| 3,991,299 | 11/1976 | Chadima, Jr. et al. | 235/61.11 E |

Primary Examiner—Daryl W. Cook
Attorney, Agent, or Firm—Robert S. Hulse

[57] ABSTRACT

A keyless electronic calculator includes an optical bar-code reader for entering bar-coded program information, in the form of data and individual commands or complete programs, into the calculator. The calculator also includes a read-write memory unit (RWM) for storing the entered information, a central processing unit (CPU) having a read-only-memory unit (ROM) with pre-stored routines for processing data by executing the entered commands or program under control of the ROM routines, and a display unit for displaying entered data and execution results. An alternative embodiment of the calculator includes both an optical input means and a keyboard.

18 Claims, 12 Drawing Figures

ELECTRONIC CALCULATOR WITH OPTICAL INPUT MEANS

BACKGROUND OF THE INVENTION

The present invention relates generally to data processors and more particularly to electronic calculators. It is commonly realized that the number of different functions performed by a calculator is often limited by the number of available calculator keys or available keyboard configurations, each configuration representing a combination of different keys of the keyboard. Generally, a key may be used to perform only a limited number of functions, viz., those functions identified by labels located on or near the key. It is often difficult to place more than three such marks on or near a key to identify that key for multiple use. Furthermore, keyboards having a plurality of keys limit the size of the calculator because not only must the keys be finger-size, but the calculator itself must be large enough to contain the keys and to legibly display the labels of the keys.

A device that would be capable of not only entering data but also of entering and executing commands and entering, storing and executing programs without the above-mentioned keyboard limitations would, therefore, be very useful and desirable.

SUMMARY OF THE INVENTION

Thus, in accordance with the illustrated preferred embodiment of the present invention, an electronic calculator is provided having no keys and having a user-operated wand-type optical bar-code reader for entering program information such as data, commands (for example, operation codes or function codes such as "+", "$y^x$" or "LOG"), and complete programs into the calculator. The calculator processes the entered data by executing the entered commands or program. A typical bar-code wand-type optical reader for entering bar-coded data is described, for example, in U.S. Pat. No. 3,784,794 entitled "Electro-optical Reader for Bar Codes or The Like", issued Jan. 8, 1974 to David C. Allais. Execution of commands occur as the individual command or group of commands is entered by the user. Program execution occurs upon complete entry of the program into the calculator and entry of a "RUN" command following entry of the program.

Programs, commands, and data values are printed in bar-code form on printed sheets supplied to the user. To enter data, to enter and execute commands, and to enter and execute programs, the user scans the appropriate data, command, and program code with his wand. The program code may have been pre-printed and supplied to the user or may be assembled by the user from supplied data and command codes.

An alternative embodiment of the calculator is provided which includes a keyboard in addition to the bar code reader. A user, in utilizing this calculator, may enter programs, commands and data by means of the reader or keyboard or both.

DESCRIPTION OF THE PREFERRED EMBODIMENT

Figure 1:
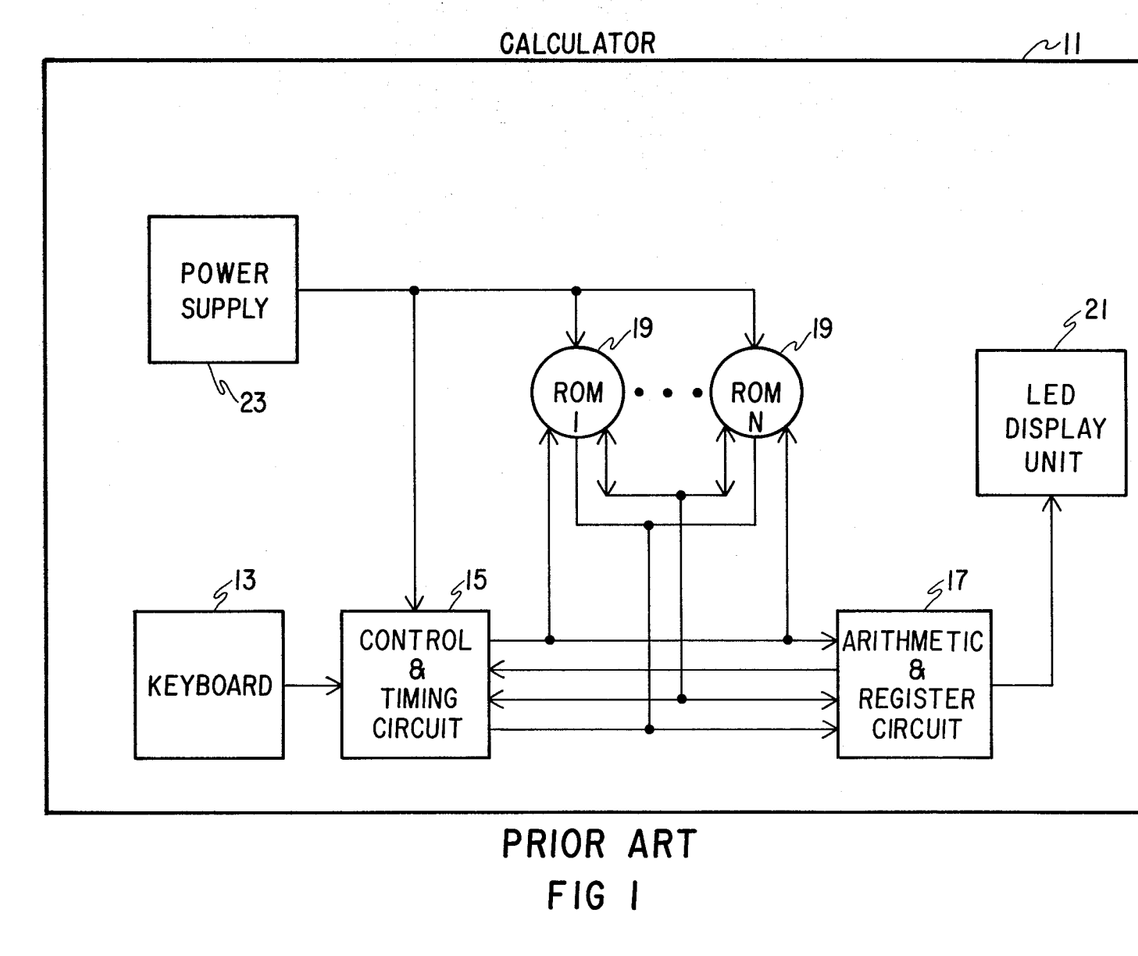
FIG. 1 is a block diagram of a conventional electronic calculator as found in the prior art.

Referring to FIG. 1, there is represented a conventional calculator 11 as in the prior art, including a keyboard input unit 13, a control and timing circuit 15, an arithmetic and register circuit 17, at least one storage means such as a read-only memory (ROM) 19, a light-emitting diode (LED) output display unit 21, and a power supply (battery or AC) 23. The control and timing circuit 15 is shown in greater detail in FIG. 2. This calculator and the aforementioned elements thereof shown in FIGS. 1 and 2 may be constructed and operated, for example, in the manner shown and described in U.S. Pat. No. 3,863,060 entitled "General Purpose Calculator with Capability for Performing Interdisciplinary Business Calculations", issued Jan. 28, 1975 to France Rode et al., and incorporated by reference herein (see, for example, FIGS. 2, 4–6, and 10, and the associated descriptions thereof in the referenced patent).

Figure 3:
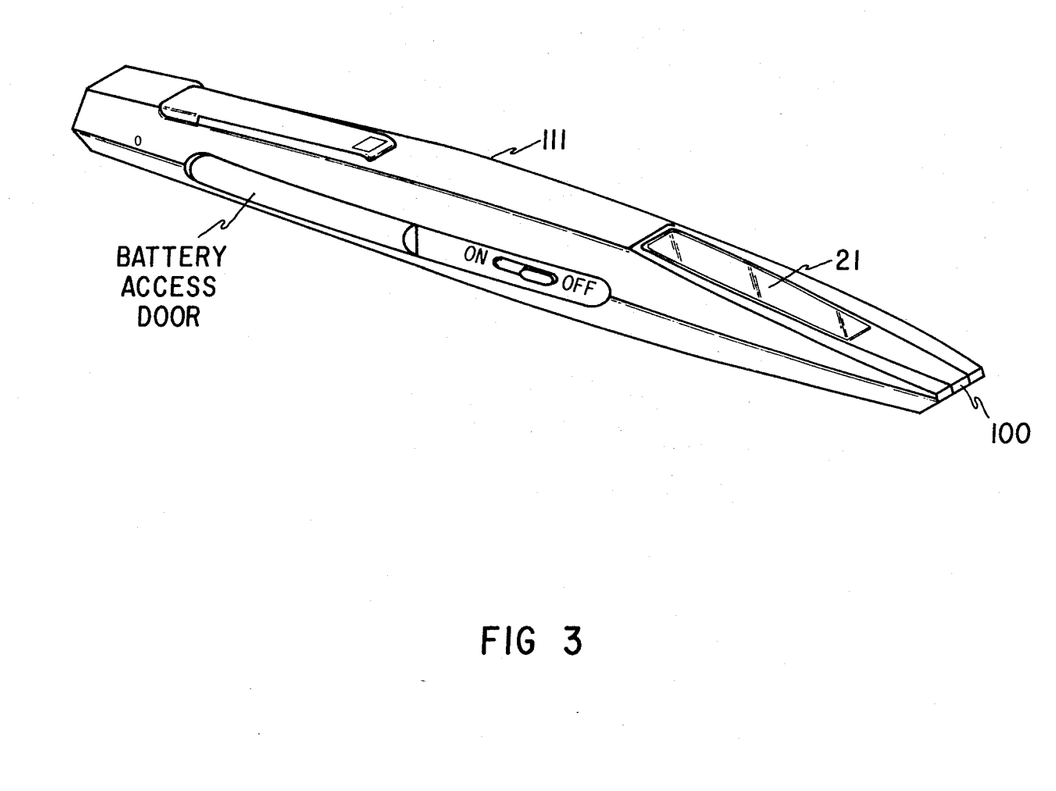
FIG. 3 is a diagrammatic illustration of a keyless calculator in accordance with the preferred embodiment of this invention.
Figure 4:
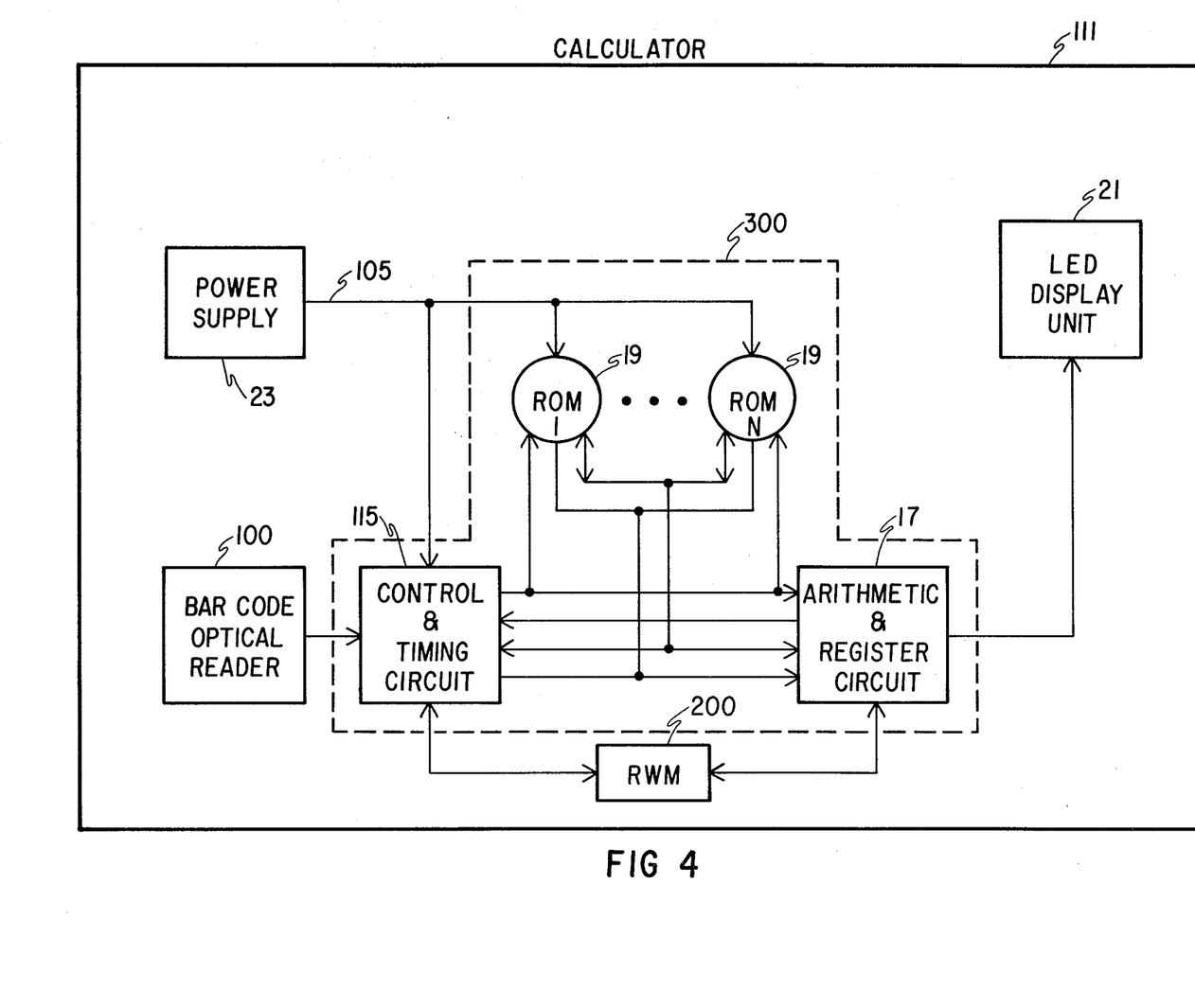
FIG. 4 is a block diagram of the calculator of FIG. 3 showing various components of the calculator, including a control and timing circuit for controlling input information from a bar-code optical-reader.

Referring now to FIG. 3 herein, there is shown a keyless calculator 111 including a bar-code optical reader 100, and LED display 21. This keyless calculator 111 is also shown in FIG. 4 to include an electrical connection 105 which, for example, may be coupled externally to an AC power source or internally to a battery, a RWM (read-write-memory) unit 200, and a processor 300 having a control and timing circuit 115.

Figure 2:
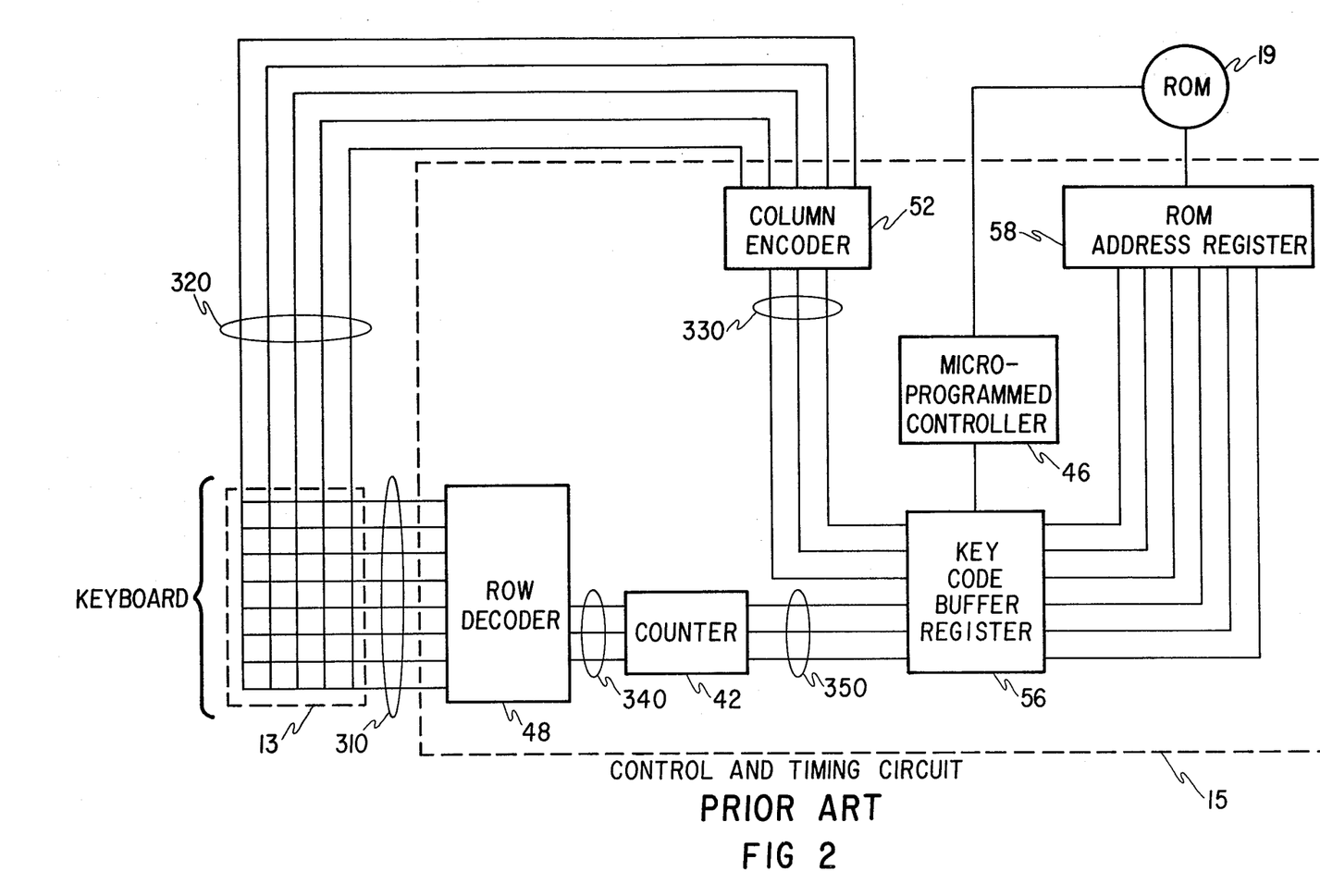
FIG. 2 is a block diagram of a control and timing circuit employed in the calculator of FIG. 1.
Figure 5:
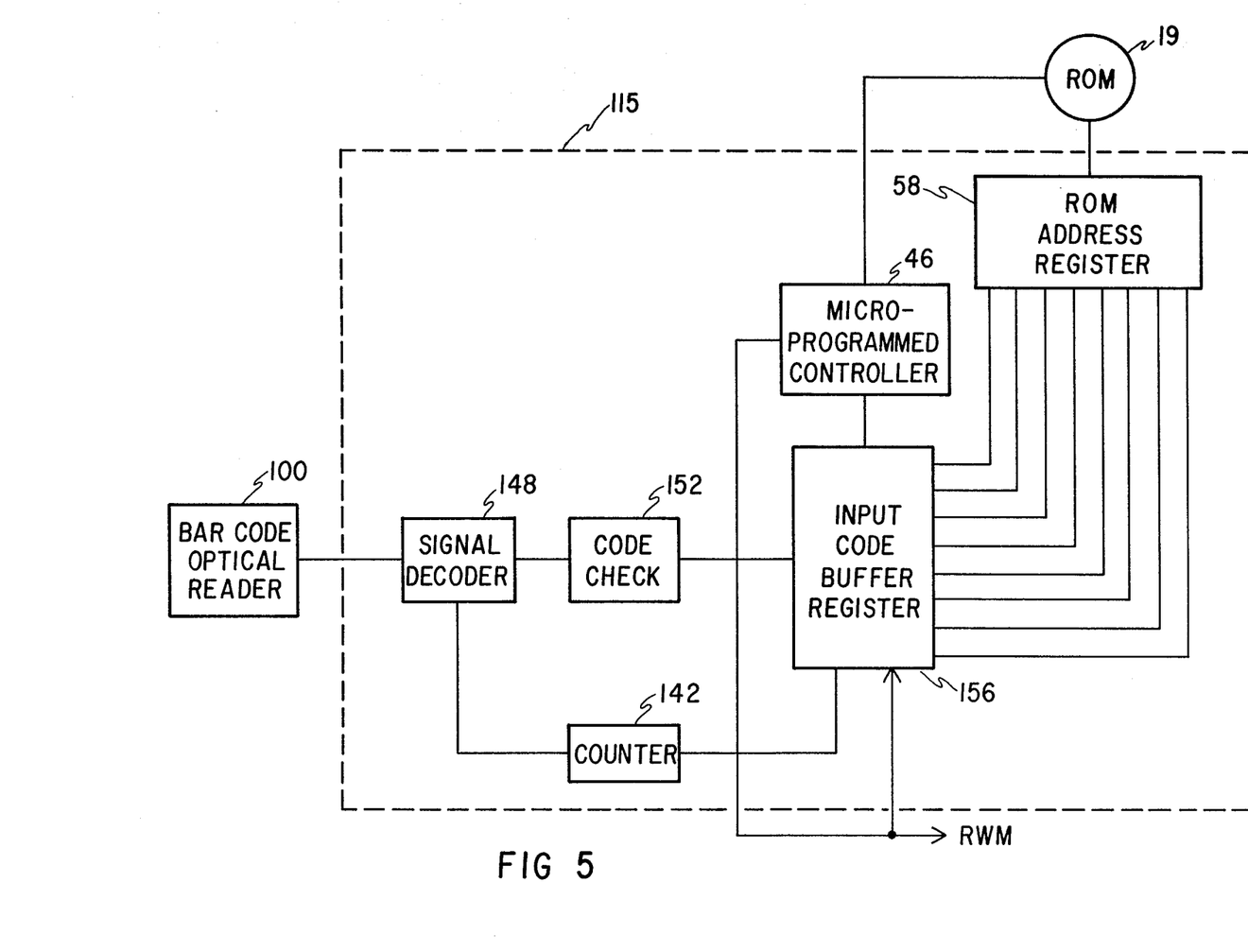
FIG. 5 is a detailed block diagram of the control and timing circuit of FIG. 4.

Control and timing circuit 115 is a modified version of control and timing circuit 15 (FIG. 2). As shown in FIG. 5, Circuit 115 is similar in structure and operation to circuit 15 except that row and column decoders 48 and 52 of circuit 15 have been replaced by signal decoder 148 and code-check unit 152. Also, counter 42 and key code buffer 56 of circuit 15 have been replaced by counter 142 and input code buffer register 156 as indicated in circuit 115. Unlike counter 42 which, as shown in FIG. 4 of above referenced U.S. Pat. No. 3,863,060 and in FIG. 2 herein, performed both a keyboard scanning function (to determine when a key is depressed) and an input bit timing function, the keyboard scanning function is made unnecessary for counter 142 (FIG. 5) because of the absence of a keyboard. For counter 142 (FIG. 5), the connections ordinarily existing between counter 42 and row and column decoders 48 and 52 as shown in FIG. 4 of U.S. Pat. No. 3,863,060 are severed, and the timing connection (to timing decoder and synchronization buss 26 of FIG. 4 of U.S. Pat. No. 3,863,060) maintained. Likewise, similar to key code buffer 56 (FIG. 2), input code buffer 156, FIG. 5, receives binary input information from the counter and temporarily stores the information, but unlike key code buffer 56, input code buffer 156 interfaces with RWM 200.

Figure 6A:
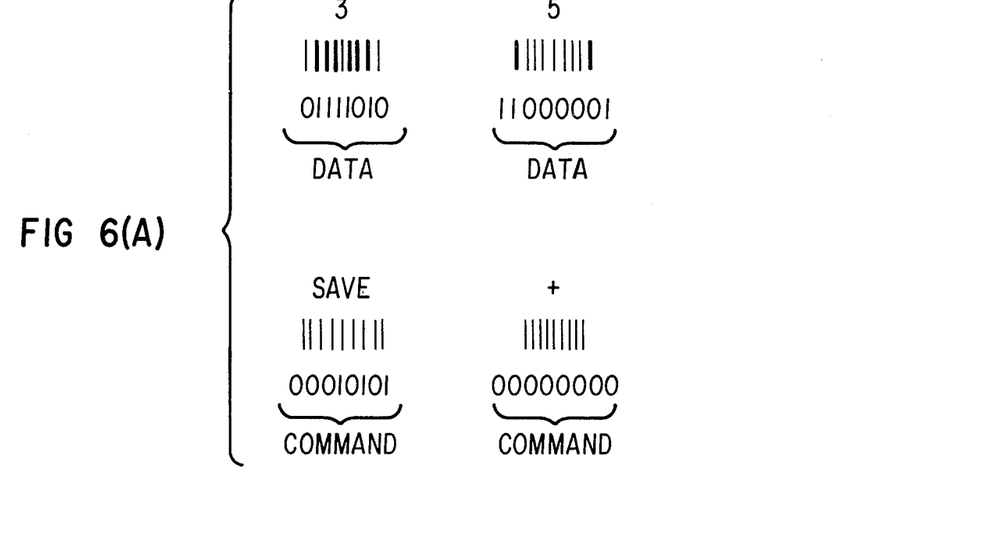
FIGS. 6(A)–6(C) are diagrammatic illustrations of data, commands and a program in bar-coded and binary form suitable for optical input to the calculators of FIGS. 3, 9 and 10.
Figure 6B:
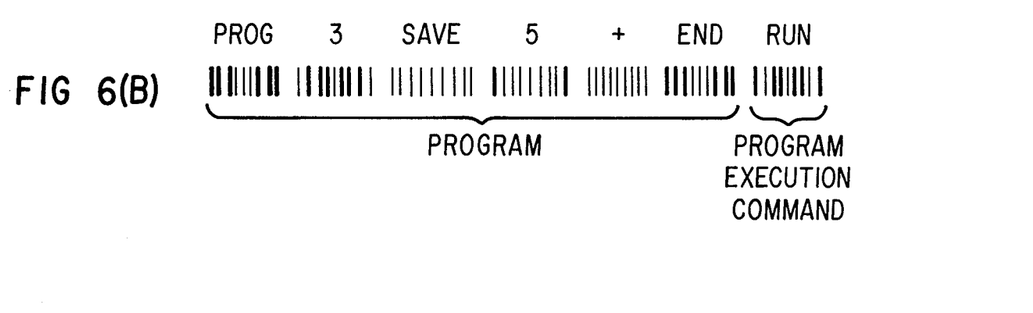
Figure 6C:
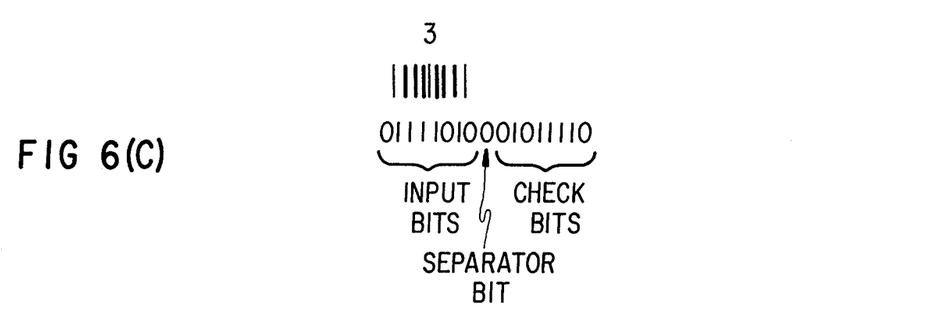

FIGS. 6(A), 6(B) and 6(C) show selected data and commands and a program encoded and printed on a sheet of paper. Each data value or command is represented by a bar-code equivalent to eight bits of input information. To enter encoded information into the calculator 111 (FIG. 3), the user selects a bar-coded data value, or command, or program, and scans the selected information by passing the optical reader 100 continguously across the selected bar-coded information. As shown by circuit 115 of FIG. 5, the scanned information is read by optical reader 100 which converts the scanned information to a digital signal, and applies the digital signal to signal decoder 148. Decoder 148 converts the digital signal to a 17-bit binary sequence as shown, for example, in FIG. 6(C), each bit of the sequence being generated in synchronization with one count of counter 142.

The 17 bits represent two eight-bit sequences (bits 1-8 and bits 10-17) separated by a "separator bit" (bit 9). Bits 1-8 represents the binary equivalent of the input digital signal. Bits 17-10 represent a mirror image of bits 1-8 when the input data is error-free (e.g., without transmission or conversion errors). See, for example, FIG. 6(C) which shows bits 17-10 as check bits appearing as mirror images of bits 1-8. Signal decoder 148 applies the 17 bits to code check unit 152 which checks to determine if bits 17-10 are in fact the mirror image of bits 1-8. If bits 17-10 are the mirror image of bits 1-8, bits 1-8 are transferred to input code buffer 156. If bits 17-10 are not the mirror image of bits 1-8, bits 1-8 are not transferred to input code buffer 156; instead, a feedback signal in the optical reader 100 is activated for the user to re-scan the input information.

Figure 7:
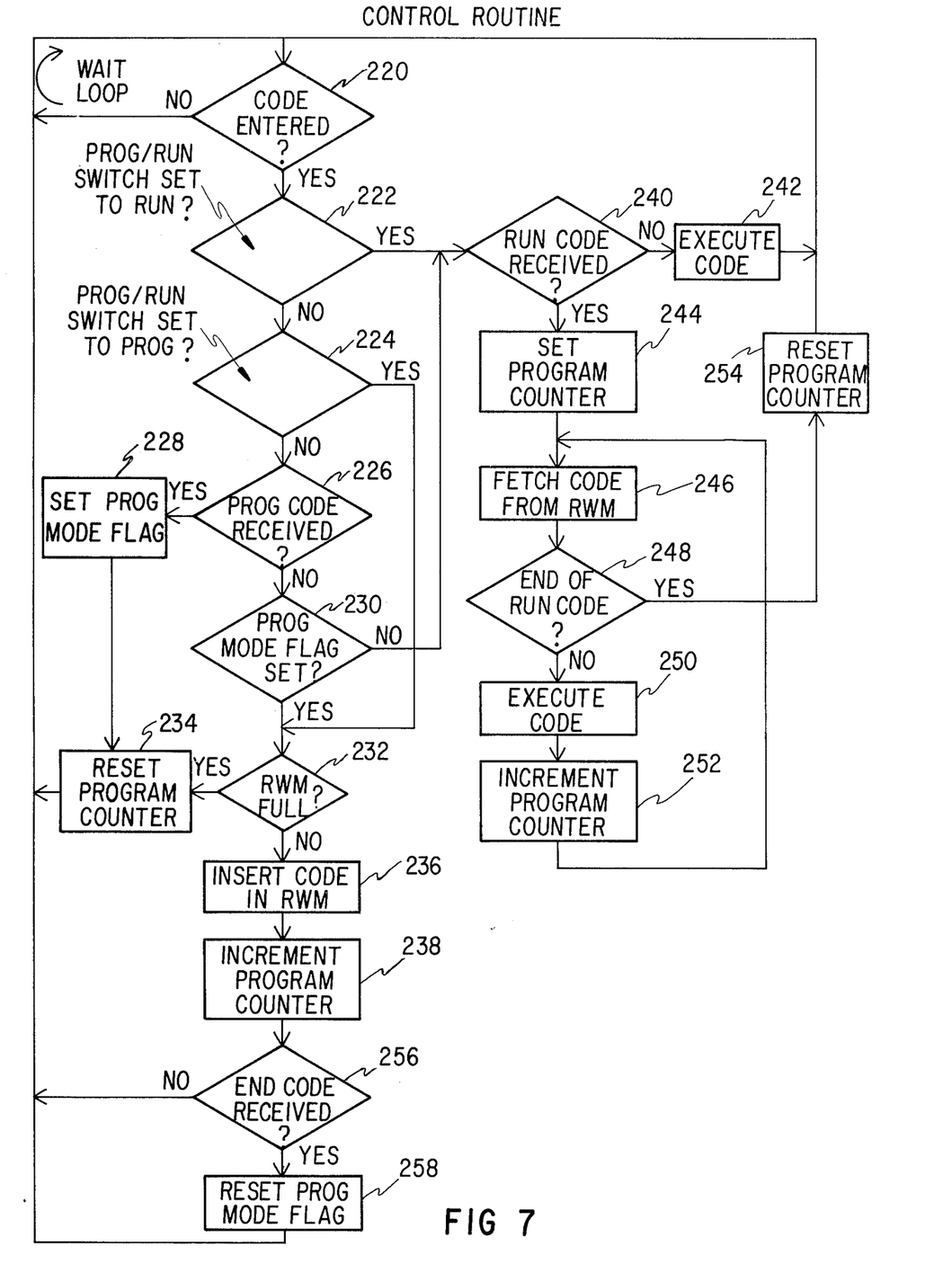
FIG. 7 is a logic flow diagram of a routine stored in a ROM of the calculator of FIGS. 4 and 8.

From temporary storage in buffer 156, bits 1-8 are transferred by controller 46, under control of ROM routine "CONTROL" shown in flow-chart form in FIG. 7, to ROM address register 58 where these bits become a starting address for an execution routine (also stored in ROM 19) that processes or executes the particular eight bits. This processing operation performed by the execution routine (e.g., depicted by blocks 242 and 250 of FIG. 7) is similar to the processing operation disclosed in the above-reference patent for keyboard input, see for example, column 10, line 19 of the above-reference patent. Thus, eight bits of input information are transferred to ROM address register 58 and are processed by a ROM execution routine within at least 17 bit counts of counter 142. In the event a program is to be loaded into the calculator 111 and then executed, a program-identification code (PROG) is placed at the beginning of the program and an end-program code (END) is placed at the end of the program followed by a RUN code, as shown in FIG. 6(B).

Each block of the flow-chart of the CONTROL routine (FIG. 7) represents an operation performed by the routine. An explanation of each block is presented following.

Figure 9:
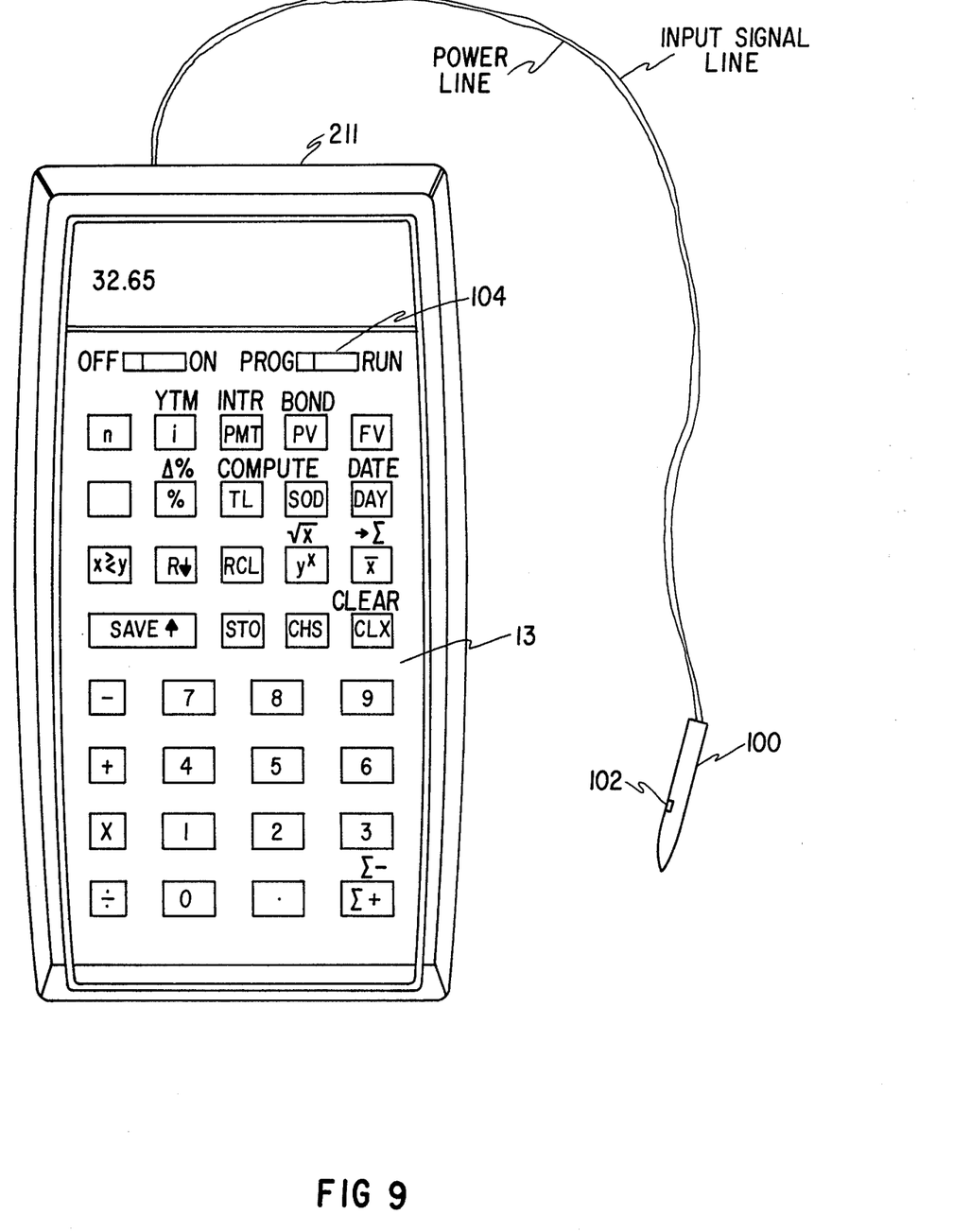
FIG. 9 is a diagrammatic illustration of the calculator of FIG. 8 having a wand-type optical bar-code reader.

According to block 220, the calculator waits until input information (representing an eight-bit data or command code) is transferred to buffer 156, then transfers control to block 222. If calculator 111, as shown in FIG. 3, does not have a PROG/RUN switch 104 (as shown in FIG. 9, representing an alternative embodiment of the present invention, hereinafter explained), control is transferred from block 222 to block 224 then to block 226.

If the input information is not part of a program to be stored (in which case PROG, END or RUN codes are not entered) but is a command to be executed upon entry, or data to be processed upon entry, control is transferred from block 226 to block 230, to block 240, and then to block 242. At block 242, the CONTROL routine transfers the input information (eight bits) from buffer 156 to ROM address register 58 where this information becomes the starting address of an execution routine (stored in the ROM) that processes the input information. After processing the input information, the ROM execution routine returns control to the CONTROL routine at block 242, after which the CONTROL routine transfers control to block 220 causing the calculator to await further input information.

In the event a program is to be stored in the calculator 111 for later execution, a PROG code placed at the beginning of the program causes the CONTROL routine to transfer control from block 226 to block 228. At block 228, a "program mode" flag is set internally in a word of RWM 200 by the CONTROL routine to indicate that the calculator 111 is now in programstorage mode, after which control is transferred to block 234. The operation performed at block 234 resets the contents of a program counter (a counter in memory which the CONTROL routine uses to "point to" or "address" current eight-bit words of RMW 200) to an initial RWM word address and returns control to block 220. At block 232, the CONTROL routine compares the contents of the program counter to the last address of RWM 200. If the contents of the program counter exceeds the last address of RMW 200, the RWM is regarded as being full and the contents of the program counter is reset to an initial RWM word address, after which the CONTROL routine returns control to block 220. If RWM 200 was not full, control is transferred from block 232 to block 236 where the input information is inserted into RWM 200 at the word (location) specified by the contents of the program counter. Following the operation at block 236, the contents of the program counter is incremented to point to the next word of the RWM 200 to receive input information, after which control is transferred to block 256. At block 256, the CONTROL routine examines the input information to determine if it is an END code. If it is an END code, the program-mode flag is reset and control is returned to block 220. If the input information is not an END code, control is returned to block 220 without resetting the program-mode flag.

The CONTROL routine examines all data and commands contained in the program being input to buffer 156 by optical reader 100, and transfers from the buffer into successive eight-bit words of RWM 200 each eight bits of input information, including the END code, received by buffer 156. Upon storage of the END code in RWM 200, program storage is regarded as complete, the program-mode is reset, and control is returned by the CONTROL routine to block 220. Input of a subsequent EXECUTE or RUN code then causes the CONTROL routine to transfer control from block 220 to block 244, via block 222 if the calculator had a program-run switch set to "run" or via blocks 222, 224, 226, 230 and 240 for a calculator without a program-run switch and with its program-mode flag reset. At block 244, the CONTROL routine sets the program counter to the address of the first word of the program stored in RWM 200 that is to be executed. After this operation, as blocks 246 and 248 show, the contents of the word are fetched from the RWM, then transferred to buffer 156 and examined to determine if it is an END code. If upon examination, the contents of buffer 156 are found to be a code other than an END code, the code is transferred from buffer 156 to ROM address 58 where the code becomes a starting address for an execution routine (also stored in ROM 19) to which the CONTROL routine transfers control. The execution routine executes the code as indicated by block 250, and returns control to the CONTROL routine, after which the CONTROL routine increments the program counter to address the next word of RWM 200 to be processed. This incrementing operation is shown by block 252. Successive words of the program stored in RWM 200 are processed in similar manner until an END code is encountered. When an END code is encountered, as shown at block 248, execution is deemed completed, the program counter is reset as shown by block 254, and control is returned to block 220.

To execute the stored program, therefore, it can be seen that processor 300, operating under the control of the ROM routine "CONTROL", consecutively accesses the words of RWM 200 containing the stored program and transfers the contents of each word to buffer 156. Buffer 156, in turn, transfers the eight-bit contents of each word to ROM address register 58 where each eight bits becomes the starting address of a ROM routine which processes the particular eight bits. Successive eight bits of program information (data and commands) are processed in this manner, and the results displayed in LED display unit 21, as described in the above-referenced patent, until the program is completely executed.

Referring now to FIG. 6(A) for an example of a keyless calculator operation: to perform the operation 3 + 5 = 8, the user simply scans the bar-coded three, then the bar-coded SAVE command (to store the data into an arithmetic register of the arithmetic and register circuit 17 of processor 300 as shown in FIG. 4), the bar-coded five, and lastly the bar-coded plus sign, after which the result "8" is displayed. No keyboard input is required. If the individual data values 3 and 5, and the commands SAVE and "+" were bar-coded and sequentially arranged in program form as shown in FIG. 6(B), a simple scan of the information (from PROG command to RUN command) would produce the result "8" displayed in display unit 21. Upon completion of each data entry operation, the entered data is displayed. During the period that a command is being executed, the display 21 is blanked. Upon completion of execution of a command, the result of the execution is displayed.

Bar-coded material representing data, individual commands and complete programs may be supplied to the user on convenient printed cards or on printed pages of a booklet. Without having to enter information from a keyboard, the user can perform a plethora of calculator operations simply by selectively scanning the supplied material or programs that he has assembled from the supplied material.

Figure 8:
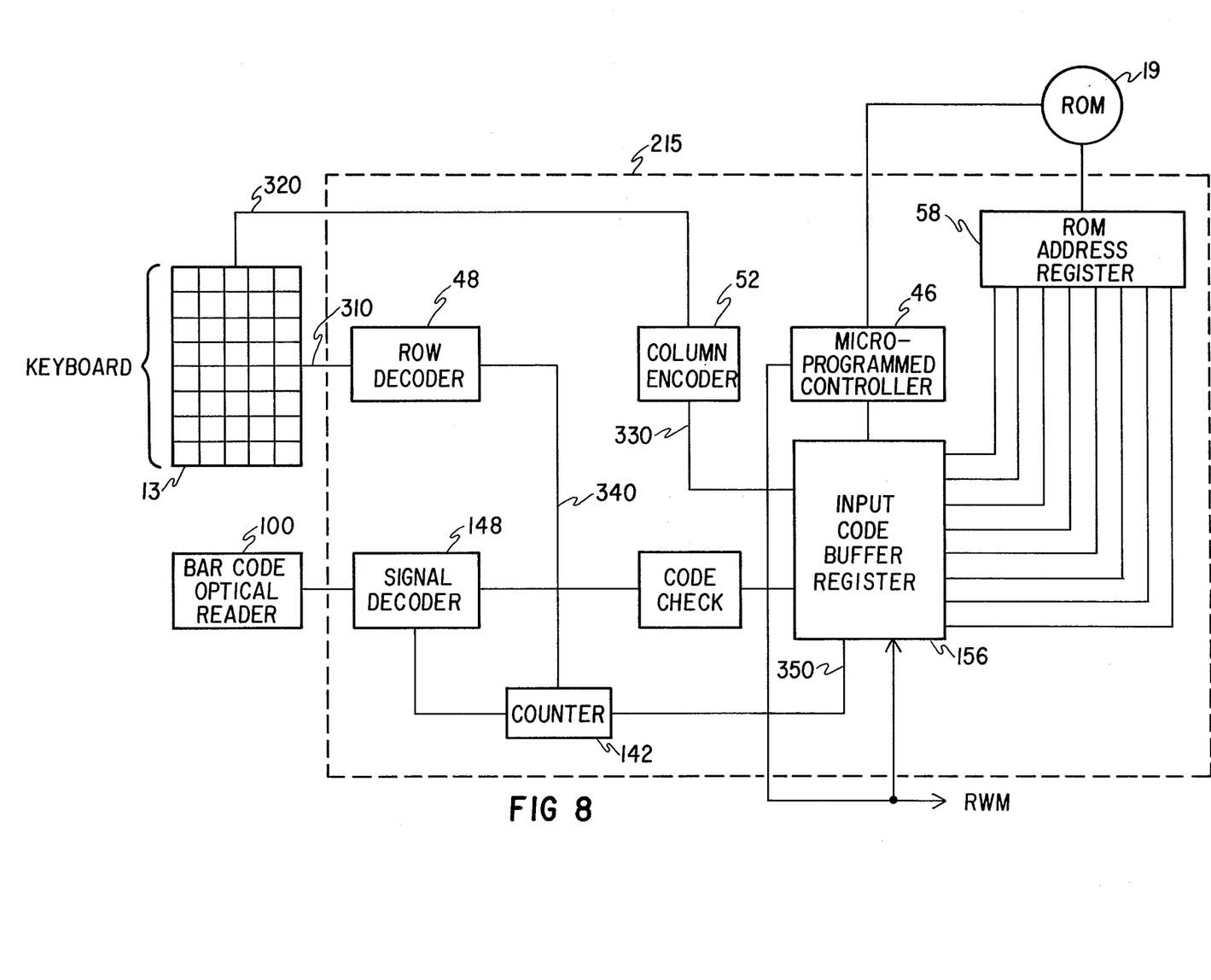
FIG. 8 is a block diagram depicting an alternative embodiment of the calculator of the present invention having a keyboard and an optical bar-code reader as input devices.

An alternative embodiment of the present invention is shown in FIGS. 8 and 9, featuring a keyboard 13 as well as a wand-type optical bar-code reader 100, intended for use by persons desiring keyboard interaction in addition to optical input. In FIG. 9 the optical bar-code reader 100 is shown having a two-position external switch 102 which may be set by the user to a first position enabling optical input and disabling keyboard input, and to a second position enabling keyboard input and disabling optical input. When optical input is enabled, circuit 215 of FIG. 8 controls calculator operation in the same manner as circuit 115 of FIG. 5, providing for optical input only, as described hereinbefore. When keyboard input is enabled, circuit 215 of FIG. 8 controls calculator operation in the same manner as circuit 15 of FIG. 2, providing the keyboard input only, as described in the U.S. Pat. No. 3,868,060 referenced hereinbefore.

If the calculator 211 shown in FIG. 9 includes a PROG/RUN (program or run mode) switch 104 or similar functioning switch, entries from the keyboard 13 and from the optical reader 100 are stored in RWM 200 (FIG. 4) when switch 104 is set to the PROG position. This storage operation that occurs when PROG/RUN switch 104 is set to PROG is shown by blocks 224 and 236 of FIG. 7. When switch 104 is set to the RUN position, all entries (from keyboard 13 and from optical reader 100), are executed when made, as shown by blocks 222, 240 and 242 of FIG. 7, and any previously stored program or command is executed upon entry of an execute (run) command, as shown by blocks 222, 240 and 248 of FIG. 7. If a program having begin- and end-program codes is entered when switch 104 is set to the RUN position, the individual commands of the program are executed upon entry, and the begin- and end-program codes are ignored.

Figure 10:
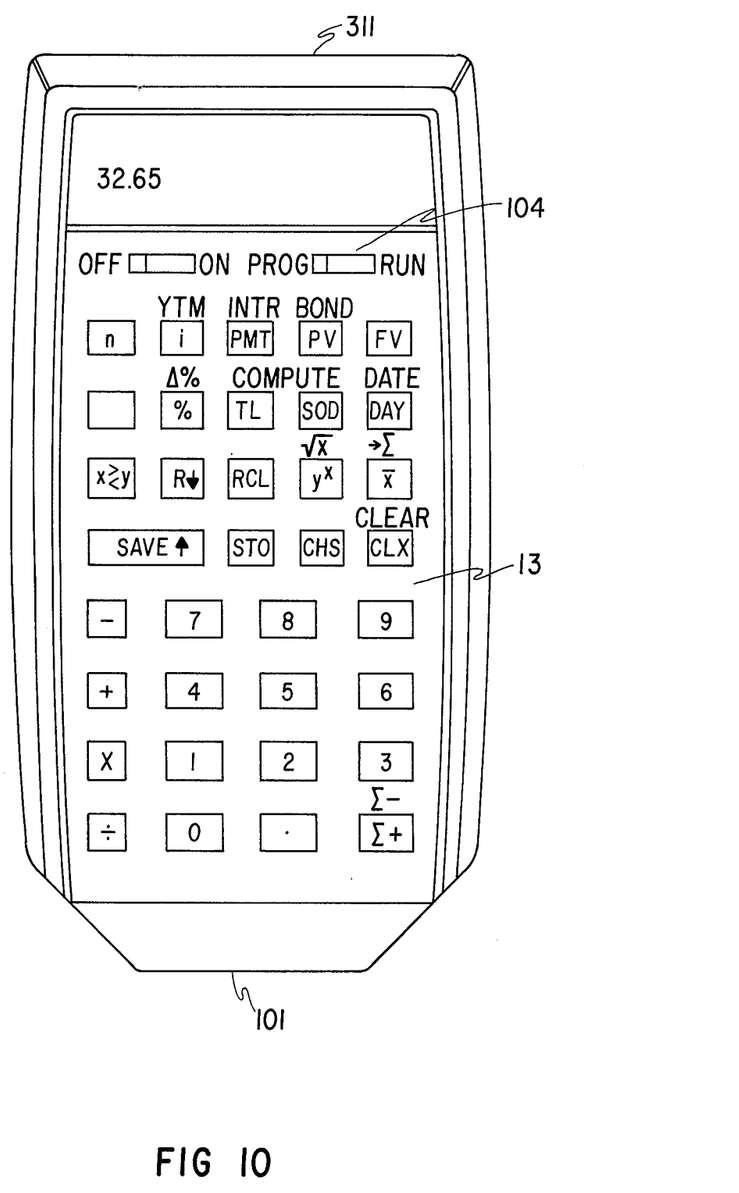
FIG. 10 is a diagrammatic illustration of another embodiment of the calculator of the present invention having a keyboard and a built-in optical bar-code reader.

Another embodiment of the present invention is shown in FIG. 10. The calculator 311 of FIG. 10 includes a keyboard 13 and an optical bar-code reader 101 built into the calculator 311. A user, in scanning bar-coded input information, passes reader 101 contiguously across the input information in the same manner as for wand reader 100.

A further embodiment of the present invention may include a reader capable of optically, magnetically, mechanically or electronically reading characters or codes other than bar codes.

We claim:

1. A keyless portable electronic calculating apparatus for entering data and at least one command encoded on a record medium and for performing calculations upon the entered data and displaying calculation results, the apparatus comprising:

manually manipulatable keyless input means for entering the data and command in response to manipulation of the input means over the data and command on the record medium, said input means being the sole means for entering data and commands;

processor means coupled to the input means for executing each entered command and performing a calculation operation upon the entered data in response to entry of said command by the input means, the entered command specifying the operation to be performed; and     display means coupled to the processor means for displaying results of the operation by the processor means in response to entry of said command by the input means.

2. The apparatus of claim 1 wherein the display means in also effective for displaying entered data in response to entry of the data by the input means, and for displaying selected entered commands in response to entry of the commands by the input means.

3. The apparatus of claim 1 wherein the processor means includes a circuit means having a buffer means and includes a storage means with at least one stored routine, the circuit means operating under control of one of the stored routines for controlling calculation operations performed upon entered data in response to entry of at least one command by the input means.

4. The apparatus of claim 1 wherein the manually manipulatable keyless input means is an optical reader.

5. The apparatus of claim 4 wherein the optical reader is a bar-code optical reader.

6. A keyless portable electronic calculating apparatus for entering and storing a program encoded on a record medium and executing and stored program in response to entry of a selected command, the apparatus comprising:
    manually manipulatable keyless input means for entering the program in response to manipulation of the input means over the program on the record medium, said input means being the sole means for entering the program;
    memory means for storing the entered program; processor means coupled to the input means and to the memory means for executing the stored program in response to entry of a selected command by the input means; and
    display means coupled to the processor means for displaying results of the execution of the program by the processor means.

7. The apparatus of claim 6 wherein the processor means includes a circuit means having a buffer means and includes a storage means with at least one stored routine, the circuit means operating under control of one of the stored routines for causing storage of the entered program into the memory means and execution of the stored program in response to entry of a selected command by the input means.

8. The apparatus of claim 6 wherein the manually manipulatable keyless input means is an optical reader.

9. The apparatus of claim 8 wherein the optical reader is a bar-code optical reader.

10. A portable electronic calculating apparatus for entering data and at least one command encoded on a record medium and for performing calculations upon the entered data and displaying calculation results, the apparatus comprising.
    manually manipulatable keyless input means for entering the data and command in response to manipulation of the input means over the data and command on the record medium;
    keyboard input means having at least one key for entering data and commands in response to operator actuation of at least one key;
    processor means coupled to the keyboard and keyless input means for executing each entered command and performing a calculation operation upon the entered data in response to entry of said command by one of the keyboard and keyless input means, the entered command specifying the operation to be performed; and
    display means coupled to the processor means for displaying results of the operation by the processor means in response to entry of said command by one of the keyboard and keyless input means.

11. The apparatus of claim 10 wherein the display means is also effective for displaying entered data in response to entry of the data by at least one of the keyboard and keyless input means, and for displaying selected entered commands in response to entry of the commands by at least one of the keyboard and keyless input means.

12. The apparatus of claim 10 wherein the processor means includes a circuit means having a buffer means and includes a storage means with at least one stored routine, the circuit means operating under control of one of the stored routines for controlling calculation operations performed upon entered data in response to entry of at least one command by one of the keyboard and keyless input means.

13. The apparatus of claim 10 wherein the manually manipulatable keyless input means is an optical reader.

14. The apparatus of claim 13 wherein the optical reader is a bar-code optical reader.

15. A portable electronic calculating apparatus for entering and storing a program encoded on a record medium and executing the stored program in response to entry of a selected command, the apparatus comprising:
    manually manipulatable keyless input means for entering the program in response to manipulation of the input means over the program on the record medium;
    keyboard input means having at least one key for entering a program in response to operator actuation of at least one key;
    memory means for storing the entered program;
    processor means coupled to the keyboard and keyless input means and to the memory means for executing the stored program in response to entry of a selected command by one of the keyboard and keyless input means; and
    display means coupled to the processor means for displaying results of the execution of the program by the processor means.

16. The apparatus of claim 15 wherein the processor means includes a circuit means having a buffer means and includes a storage means with at least one stored routine, the circuit means operating under control of one of the stored routines for causing storage of the entered program into the memory means and execution of the stored program in response to entry of a selected command by one of the keyboard and keyless input means.

17. The apparatus of claim 15 wherein the manually manipulatable keyless input means is an optical reader.

18. The apparatus of claim 17 wherein the optical reader is bar-code optical reader.

* * * * *

UNITED STATES PATENT AND TRADEMARK OFFICE
CERTIFICATE OF CORRECTION

PATENT NO. : 4,091,270
DATED : May 23, 1978
INVENTOR(S) : Bernard E. Musch and Roy E. Martin It is certified that error appears in the above-identified patent and that said Letters Patent are hereby corrected as shown below:

Column 3, line 29, delete "represents" and insert -- represent --.

Column 4, line 34, delete "RMW" and insert -- RWM --.

Column 4, line 39, delete "RMW" and insert -- RWM --.

Column 7, line 19, after executing, delete "and" and insert -- the --.

Column 7, line 2, delete "in" and insert -- is --.

Signed and Sealed this

Twentieth Day of November 1979

[SEAL]

Attest:

RUTH C. MASON
Attesting Officer

LUTRELLE F. PARKER
Acting Commissioner of Patents and Trademarks